United States Patent [19]

Yaniger

[11] Patent Number: 5,365,671
[45] Date of Patent: Nov. 22, 1994

[54] INCLINOMETER

[75] Inventor: Stuart I. Yaniger, Ventura, Calif.

[73] Assignee: Interlink Electronics, Inc., Camarillo, Calif.

[21] Appl. No.: 102,568

[22] Filed: Aug. 5, 1993

[51] Int. Cl.$^5$ .................................................. G01C 9/06
[52] U.S. Cl. ........................................... 33/366; 33/365
[58] Field of Search ................... 33/364, 366, DIG. 1, 33/361, 365, 11

[56] References Cited

U.S. PATENT DOCUMENTS

| | | | |
|---|---|---|---|
| 2,722,056 | 11/1955 | Stimler | 33/366 |
| 2,767,586 | 10/1956 | Jancosek et al. | 73/305 |
| 2,825,977 | 3/1958 | Fayers et al. | 33/361 |
| 3,084,443 | 4/1963 | Kaatz et al. | 33/364 |
| 3,128,562 | 4/1964 | Toshikazu Yusa | 33/364 |
| 4,063,366 | 12/1977 | Bane | 33/366 |
| 4,344,235 | 8/1982 | Flanders | 33/366 |
| 4,561,299 | 12/1985 | Orlando et al. | 33/366 |
| 4,614,041 | 9/1986 | Darton et al. | 33/327 |
| 4,700,479 | 10/1987 | Saito et al. | 33/366 |
| 4,803,426 | 2/1989 | Odagawa et al. | 33/364 |
| 4,811,491 | 3/1989 | Phillips et al. | 33/366 |
| 4,912,662 | 3/1990 | Butler et al. | 364/559 |
| 4,923,015 | 5/1990 | Barsby et al. | 33/364 |
| 4,993,162 | 2/1991 | Scholian | 33/366 |
| 5,079,847 | 1/1992 | Swartz et al. | 33/366 |
| 5,146,688 | 9/1992 | Ito | 33/366 |
| 5,148,604 | 9/1992 | Bantien | 33/366 |

FOREIGN PATENT DOCUMENTS 256911  5/1988  Germany ........................ 33/366

Primary Examiner—William A. Cuchlinski, Jr.
Assistant Examiner—G. Bradley Bennett
Attorney, Agent, or Firm—Stoel Rives Boley Jones & Grey

[57] ABSTRACT

A two-axis tilt sensor, or inclinometer (10), uses a spherical reference element (18) floating in an inert fluid (20) and including a magnet (42) to produce an asymmetrical weight distribution. The asymmetrical weight distribution maintains the spherical reference element at a constant orientation with respect to gravity, while the position of the magnet on the spherical reference element with respect to a housing (12) is detected by opposing pairs of Hall effect sensors (22) mounted on the housing. The outputs from opposing pairs of sensors are processed by differential amplifier circuits (80) to determine signals corresponding to the tilt of the inclinometer about the axes.

10 Claims, 2 Drawing Sheets

INCLINOMETER

TECHNICAL FIELD

This invention relates to tilt sensors and in particular to low-cost, electronic inclinometers.

BACKGROUND OF THE INVENTION

Tilt sensors are devices that are used to measure angular displacement relative to a reference. Tilt sensors are used in a wide variety of industrial and transportation applications for measuring inclinations and accelerations. Tilt sensors are not typically used in low-cost consumer applications because current tilt sensors are relatively complex and expensive.

Tilt sensors used to detect angular inclination or displacement with respect to a horizontal reference are known as inclinometers. The reference is typically supplied by the gravitational pull of the earth or by the angular momentum vector of a rapidly rotating mechanism. Inclinometers typically comprise a fixed element that is rigidly mounted to a piece of equipment whose inclination is to be measured, a reference element that maintains a constant orientation with respect to a reference, a sensor that measures the angular displacement between the fixed and reference elements, and a suspension system that supports the reference element while allowing relative rotation between the elements.

One common type of inclinometer, the gyroscopic inclinometer, relies on the angular momentum vector of a rapidly rotating mechanical part to provide a reference orientation. Gyroscopic inclinometers require a mechanically complex suspension for the rotating part and are, therefore, expensive. Inclinometers that rely on gravity to maintain a reference orientation typically use a suspension system including bearings that allow the reference element to continue to point downward as the orientation of the fixed element changes. A suspension system utilizing bearings that allow rotation in more than one axis is also complex and expensive.

The angular displacement between the element fixed with respect to the equipment and the reference element can be sensed in a variety of ways. For example, in optical inclinometers, a beam of light typically originates in the fixed element and is reflected by the reference element. The reference element may be, for example, a pendulum having a reflective surface. By using photodetectors to determine the resulting direction of the reflected light beam, the angular displacement between the fixed element and the reference element can be determined. Such inclinometers are relatively complex, requiring a light source and multiple photodetectors.

Capacitive inclinometers typically utilize conductive plates as part of the fixed element. The reference element is located between the plates of the fixed element. Changing the angular displacement of the reference element with respect to the plates changes the dielectric constant of the space between, and therefore the capacitance of, the plates. The change in capacitance is detected and converted to a corresponding tilt angle.

For example, as a pendulum suspended partly between the conductive plates pivots into or out from the space between the plates, the capacitance of the plates changes. Similarly, a fluid may partly fill the space between the plates, and the capacitance will change as the fluid-filled area of the plates changes. Another capacitive inclinometer uses a magnetically levitated ball suspended between four conductive plates. As the device is tilted, the equilibrium position of the suspended ball changes in relationship to the four plates, causing the capacitance of the capacitors defined by opposing plates to change. Capacitive sensors typically require relatively complex circuitry to convert the change in capacitance to a corresponding change in tilt angle and a relatively complex mechanical suspension system to maintain the reference element between the plates without touching the plates.

Because of the relative complexity of sensing technologies and of methods of suspending the reference element within the fixed element, inclinometers are costly and restricted to industrial applications. Such inclinometers are too complex and expensive to be mass produced for use in consumer applications.

SUMMARY OF THE INVENTION

An object of the present invention is, therefore, to provide a low-cost tilt sensor that is suitable for inclinometer applications for consumer goods.

Another object of this invention is to provide a simple and inexpensive method of positioning a reference element in relation to a fixed element to provide a tilt sensor that can be used with a variety of sensing technologies.

A further object of this invention is to implement a simple and inexpensive sensing technology in tilt sensors.

The present invention relates to a low-cost tilt sensor that can be economically mass produced and is, therefore, suitable for use in inclinometer applications for low-cost consumer goods. The invention provides an improved suspension or support for a reference element and an improved sensor for sensing the angular displacement between the reference element and the fixed element of a tilt sensor. The improved suspension for the reference element suspends the reference element within a cavity enclosing an inert fluid having a specific gravity at least equal to that of the reference element. In one preferred embodiment, the inert fluid has the same specific gravity as that of the reference element, thereby allowing the reference element to be suspended at a neutral buoyancy, i.e., in a "weightless" state. This suspension allows the reference element to remain at or return to a reference orientation without the use of a complex mechanical bearing suspension.

Alternately, the cavity can be less than completely filled with an inert fluid having a specific gravity greater than that of the reference element. The fluid level of the cavity is adjusted to support the reference element in the cavity in proper alignment with the fixed elements. In another alternative embodiment, the cavity is filed with two immiscible fluids, one having a specific gravity greater than that of the reference element and one having a specific gravity less than that of the reference element. The relative levels of the fluids are such that the reference element is supported at the correct position with respect to the fixed elements.

The preferred sensor of the invention uses a magnet positioned on the reference element and pairs of opposing Hall effect sensors located on the fixed element. As the angle between the reference element and the fixed element changes, the magnetic field across each of the Hall effect sensors changes, changing the output of the sensors. The outputs of two opposing sensors are combined in a balanced differential amplifier to produce an electrical signal corresponding to the tilt angle.

A preferred inclinometer using a tilt sensor of the present invention comprises a housing having walls that define a cavity. A spherical reference element having an asymmetrical weight distribution is rotatably suspended within the cavity in an inert fluid. The reference element is supported in an inert fluid having a specific gravity at least equal to that of the reference element or the reference element can be floating at the interface between two inert fluids, one having a specific gravity greater than that of the reference element and one having a specific gravity less than that of the reference element.

The effect of gravity or an acceleration on the asymmetrical weight distribution of the element causes the spherical reference element to maintain or assume a preferred orientation with respect to the direction of gravity or the acceleration, regardless of changes in the orientation of the housing. The angular displacement or difference in orientation, i.e., the tilt, between the housing and the reference element is sensed and indicates the inclination of the housing or the acceleration of the tilt sensor.

The difference in orientation between the reference element and the fixed element can be sensed in a number of ways. In a preferred embodiment, the difference in orientation is detected using a linear Hall effect sensor that responds to the magnetic field produced by a magnet mounted on the reference element. Other sensing methods, such as capacitive or optical methods, can also be used. A capacitive method would typically require the reference element to have asymmetrical dielectric properties. As the orientation of the reference element with respect to the housing changes, a change in capacitance of opposing pairs of plates fixed to the housing on opposite sides of the reference element is detected. The capacitive and the Hall effect methods both utilize a reference element that exhibits asymmetrical electromagnetic properties detectable by sensors on the housing. The weight of the magnet that produces the magnetic field sensed by the Hall effect sensor can also be used to produce the asymmetrical weight distribution within the reference element.

Low-cost inclinometers of the present invention can be used in conventional applications, such as for measuring the tilt angles of vehicles and heavy equipment. The low cost will also allow use in a wide variety of new applications, for example, in computer pointing devices or body position indicators for virtual reality systems. Additional objects and advantages of the present invention will be apparent from the following detailed description of preferred embodiments thereof, which proceeds with reference to the accompanying drawings.

DETAILED DESCRIPTION OF THE PREFERRED EMBODIMENTS

Figure 1:
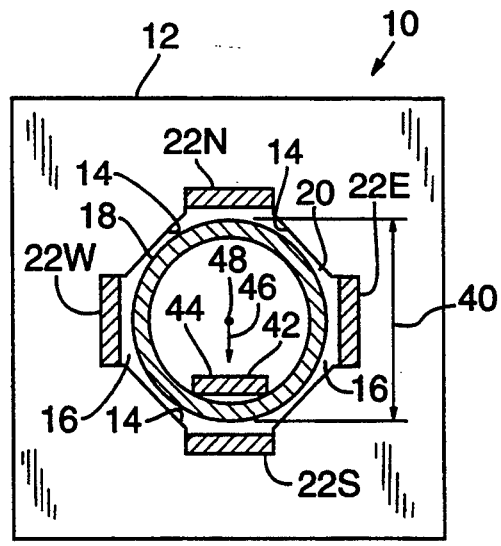
FIG. 1 is a cross-sectional view taken along a horizontal plane passing through the center of an inclinometer of the present invention.
Figure 2:
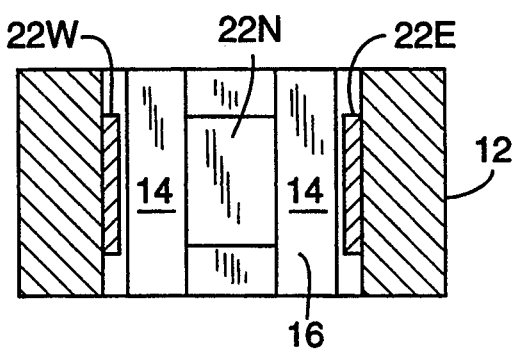
FIG. 2 is a diagrammatic cross-sectional view taken along a vertical plane through the center of the inclinometer of FIG. 1. and showing the arrangement of the sensors within the housing of the inclinometer.

FIG. 1 shows a preferred inclinometer 10 of the present invention. Inclinometer 10 comprises a housing 22 having walls 14 that define an enclosed cavity 16. A reference element 18 having an asymmetric weight distribution and electromagnetic properties is positioned within cavity 16, supported by an inert fluid 20. Sensors 22N, 22E, 22S, and 22W are affixed to housing 12 at 90° intervals around cavity 16 and detect changes in orientation of reference element 18 with respect to housing 12. FIG. 2 is a cross-sectional view showing the placement of sensors 22E, 22N, and 22W around cavity 16 in a preferred inclinometer 10.

Reference element 18 is preferably spherical and free to rotate within cavity 16, and inclinometer 10 is, therefore, capable of detecting tilt along two axes. Reference element 18 could be of other shapes. For example, in an embodiment for sensing inclination around a single axis, reference element 18 could be cylindrical.

A preferred reference element 18 is a hollow sphere composed of a material such as polypropylene and having a diameter 40 of ⅜ in (0.95 cm). A small magnet 42, such as Model No. 64-1895 from the Radio Shack Division of Tandy Corp. of Fort Worth, Tex., is mounted, such as by gluing, on an inner wall 44 of the polypropylene sphere. The weight of magnet 42 causes reference element 18 to have an asymmetrical or eccentric weight distribution. Reference element 18, therefore, tends to rotate within cavity 16 so that an arrow 46 pointing from a center 48 of reference element 18 to magnet 42 points in the direction of gravity, i.e., downward.

Magnet 42 typically produces the asymmetrical electromagnetic properties of reference element 18. Asymmetrical electromagnetic properties can also be produced by having areas of reference element 18 that exhibit different dielectric, conductive, or magnetic susceptibility properties. Different types of sensors 22 are used to detect the different asymmetrical electromagnetic properties.

It will be understood that if inclinometer 10 is accelerated, the inertia of magnet 42 will also cause the portion of reference element 18 to which the magnet is affixed to rotate away from the direction of the acceleration. Inclinometer 10 can thus be used as an accelerometer. The direction of arrow 46 is then determined by the direction of both the gravitational force and the acceleration.

Figure 3:
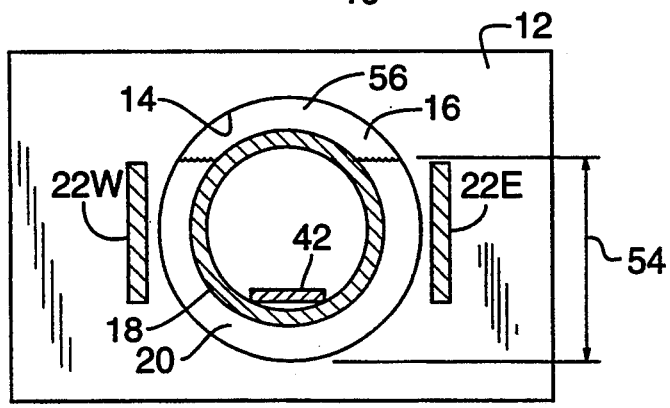
FIG. 3 is a cross-sectional view taken along a vertical plane passing through the center of the reference element and two of the sensors of an inclinometer of the present invention having a spherical cavity and using a fluid having a specific gravity greater than that of the reference element.

To allow reference element 18 to freely rotate in three dimensions, reference element 18 is supported in cavity 16 by inert fluid 20. The specific gravity of fluid 20 is at least equal to that of reference element 18, allowing reference element 18 to float in fluid 20 within cavity 16, thereby reducing friction and eliminating the need for mechanically supporting reference element 18. If the specific gravity of fluid 20 is equal to that of reference element 18, reference element 18 will be suspended at a neutral buoyancy within cavity 16. FIG. 3 shows an embodiment in which the specific gravity of fluid 20 is greater than that of reference element 18. In such an embodiment, level 54 of fluid 20 within cavity 16 is set such that reference element 18 floats midway between the top and bottom of cavity 16 and is approximately centered vertically with respect to sensors 22N, 22E, 22S, and 22W. The volume of cavity 16 that is not filled with fluid 20 comprises an airspace 56 and is filled with air or an inert gas.

Figure 4:
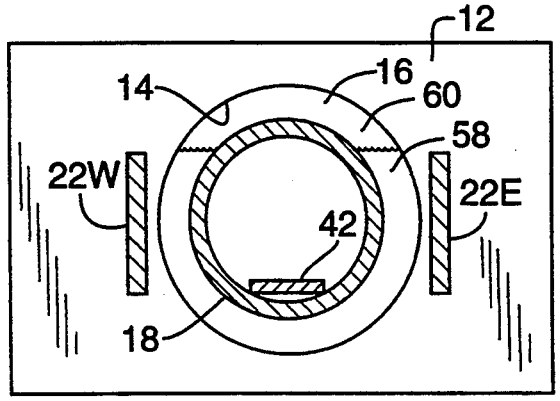
FIG. 4 is similar to FIG. 3, but the spherical cavity contains two fluids, one having a specific gravity greater than that of the reference element and one having a specific gravity less than that of the reference element.

FIG. 4 shows another embodiment in which reference element 18 is suspended at the interface between two inert fluids, a first fluid 58 having a specific gravity greater than that of reference element 18 and a second fluid 60 having a specific gravity less than that of reference element 18. Reference element 18 floats at the interface between fluids 58 and 60 partly surrounded by each. The relative volumes of fluids 58 and 60 are such that reference element 18 floats midway between the top and bottom of cavity 16 and is approximately vertically centered with respect to sensors 22N, 22E, 22S, and 22W.

The viscosity of fluid 20 is such that reference element 18 can respond to a change in orientation within an acceptable time, while the viscous drag remains sufficient to prevent excess motion and to protect reference element 18 from mechanical shock of sudden contact with housing 12. In one preferred embodiment, fluid 20 comprises a silicone fluid having a specific gravity of 0.98 such as silicone fluid 9040 from McGhan NuSil Corp. of Carpinteria, Calif. Reference element 18 could also be suspended within cavity 16 by mechanical bearings or other suspension methods.

Figure 5:
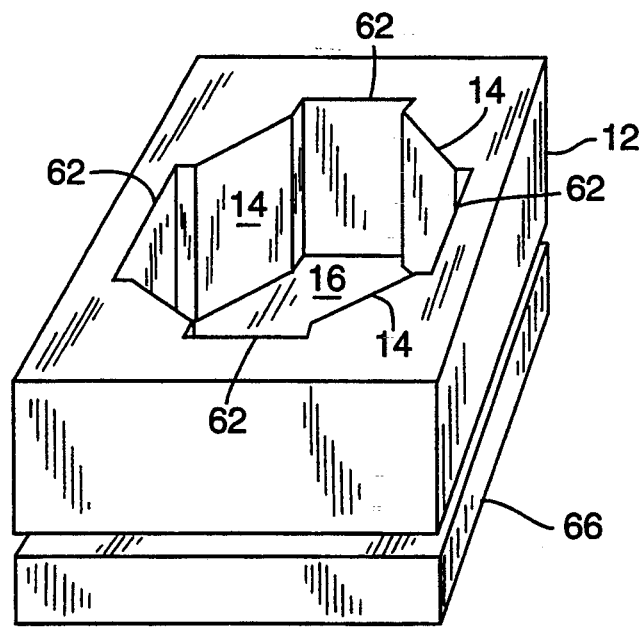
FIG. 5 is an isometric view of a housing portion and an end plate of the inclinometer of FIG. 1.

FIG. 5 shows a preferred housing 12 that is machined from a block of acrylic material and that includes multiple indentations 62 for mounting multiple sensors 22 (FIGS. 1 and 2). In a typical implementation for measuring tilt along two axes, four sensors, 22N, 22E, 22S, and 22W, are mounted at 90° intervals around housing 12 in indentations 62. Sensors 22N and 22S and sensors 22E and 22W form pairs of opposing sensors that sense tilt around respective north-south and east-west axes. Sensors 22 are preferably linear Hall effect sensors, such as Model No. UGN3503 manufactured by Allegro MicroSystems, Inc. of Worcester, Mass. Sensors 22 could be affixed to housing 12 in other ways, for example, by embedding them within housing 12 behind walls 14 as shown in FIGS. 3 and 4. First and second end plates 66 (one shown) seal housing 12 after reference element 18 is positioned within. Housing 12 is filled with fluid 20 either before second end plate 66 is attached or through a sealable fill hole (not shown) after second end plate 66 is attached. In some embodiments, such as the embodiment using a spherical cavity 16 shown in FIGS. 3 and 4, end plates 66 are not required.

Figure 6A:
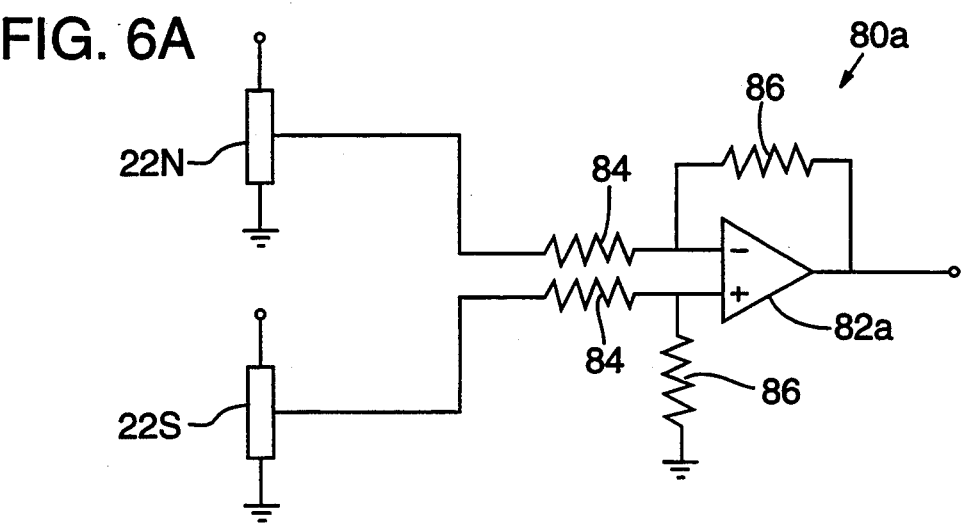
FIGS. 6A and 6B are schematic diagrams showing two balanced differential amplifier circuits that combine the outputs from pairs of opposing sensors to produce a signal representing the tilt of the inclinometer.
Figure 6B:
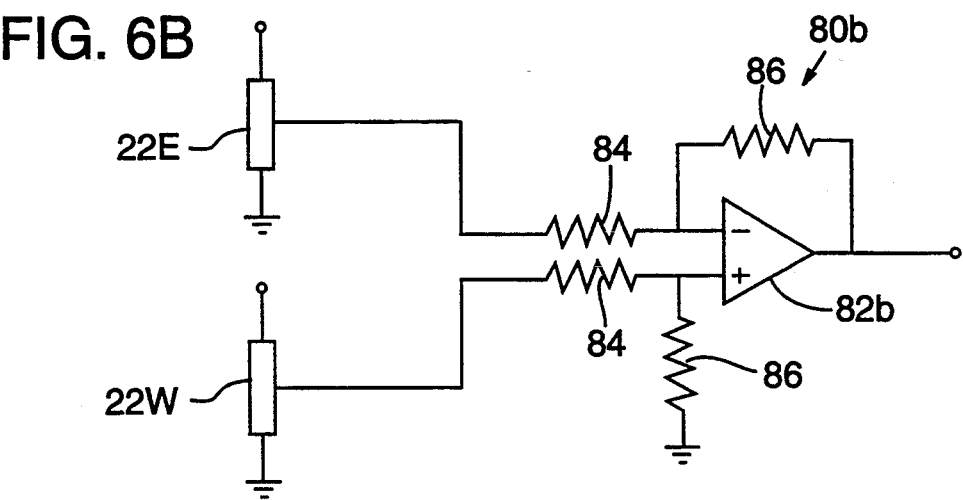

The outputs of opposing pairs of sensors 22 are electrically combined by a balanced differential amplifier to determine the tilt of reference element 18 with respect to housing 12 along a particular axis. FIGS. 6A and 6B are schematic diagrams of circuits 80a and 80b that produce signals corresponding to tilts around a north-south axis and an east-west axis, respectively. Circuits 80a and 80b are balanced differential amplifiers comprising operational amplifiers 82 having input signals from respective opposing pairs of Hall effect sensors 22N-22S and 22E-22W. The operating voltage across each of sensors 22 is typically approximately 5 V. Resistors 84 typically have a value of 10 kΩ, and resistors 86 typically have a value of 20 kΩ. By producing output signals corresponding to tilt along two axes, circuits 80a and 80b can provide information about tilt in any direction. The interpretation of the output signals can include compensations for variations in the earth's magnetic field.

Other types of sensors can also be used to detect the orientation of reference element 18 with respect to housing 12. For example, the asymmetrical electromagnetic properties of reference element 18 could be asymmetrical conducting or dielectric properties, and sensors 22 could measure capacitance to determine the relative orientation of reference element 18 and housing 12. Optical sensors could also be used with the neutral buoyancy configuration of the present invention.

Similarly, the invention could be implemented with other means of supporting reference element 18 and using Hall effect sensors to detect tilt. For example, reference element 18 could be suspended using mechanical bearings or by magnetic levitation. Hall effect inclinometer sensors could also be used to detect relative angular displacement in a gyroscopic inclinometer.

It will be obvious that many changes may be made to the above-described details of the invention without departing from the underlying principles thereof. The scope of the present invention should, therefore, be determined only by the following claims.

I claim:

1. An apparatus for sensing tilt, comprising:
   a housing having walls that define a cavity;
   a generally spherical reference element rotatably positioned within the cavity;
   a single magnet positioned within the spherical reference element imparting an asymmetrical weight distribution and a predetermined magnetic field orientation thereto;
   a fluid supporting the reference element within the cavity;
   a first pair of Hall effect sensors positioned within the housing on opposite sides of the reference element for generating a first pair of electrical signals in response to the orientation of the magnetic field relative to a first axis of the housing;
   a second pair of Hall effect sensors positioned within the housing on opposite sides of the reference element for generating a second pair of electrical signals in response to the orientation of the magnetic field relative to a second axis of the housing; and
   first and second balanced differential amplifiers electrically connected to the respective first and second pairs of electrical signals to produce first and second inclination angle signals related to a tilt of the respective first and second axes of the housing relative to the orientation of the magnetic field.

2. The apparatus of claim 1 in which the reference element has substantially the same specific gravity as that of the fluid so that the reference element is supported with neutral buoyancy within the fluid in the cavity.

3. The apparatus of claim 1 in which the reference element has a specific gravity at leash equal to that of the fluid so that the reference element floats within the fluid.

4. The apparatus of claim 1 in which the fluid comprises a first fluid having a specific gravity greater than that of the reference element, the apparatus further comprising a second fluid, immiscible with the first fluid, positioned within the cavity and having a specific gravity less than that of the reference element, whereby the reference element floats at the interface between the first and second fluids.

5. The apparatus of claim 1 in which the first and second axes are mutually orthogonal.

6. A method for sensing tilt, comprising:
positioning a single magnet within a spherical reference element to impart an asymmetrical weight distribution and a predetermined magnetic field orientation thereto;
providing a housing with a cavity therein;
placing the reference element within the cavity;
filling the cavity with a fluid to support the reference element such that it freely rotates within the cavity;
positioning a first pair of Hall effect sensors within the housing on opposite sides of the reference element for generating a first pair of electrical signals in response to the orientation of the magnetic field relative to a first axis of the housing;
positioning a second pair of Hall effect sensors within the housing on opposite sides of the reference element for generating a second pair of electrical signals in response to the orientation of the magnetic field relative to a second axis of the housing; and
generating first and second inclination angle signals related to a tilt of the respective first and second axes of the housing relative to the orientation of the magnetic field by differentially amplifying the respective first and second pairs of electrical signals.

7. The method of claim 6 in which the first and second axes of the housing are mutually orthogonal.

8. The method of claim 6 in which the filling step further comprises selecting a fluid having a specific gravity that supports the reference element with a substantially neutral buoyancy.

9. The method of claim 6 in which the filling step comprises the steps of:
selecting a fluid having a specific gravity that supports the reference element with a positive buoyancy; and
filling the cavity with the fluid to a level within the cavity sufficient to allow free rotation of the reference element.

10. The method of claim 6 in which the filling step comprises the steps of:
selecting a first fluid having a specific gravity that supports the reference element with a positive buoyancy;
selecting a second fluid immiscible with the first fluid and having a specific gravity that supports the reference element with a negative buoyancy; and
filling the cavity with amounts of the first and second fluids sufficient to suspend the reference element within the cavity.

* * * * *

UNITED STATES PATENT AND TRADEMARK OFFICE
CERTIFICATE OF CORRECTION

PATENT NO. : 5,365,671
DATED : November 22, 1994
INVENTOR(S) : Stuart I. Yaniger It is certified that error appears in the above-indentified patent and that said Letters Patent is hereby corrected as shown below:

Column 4, line 18, change "22" to --12--.
Column 6, line 66, claim 3, line 2, change "leash" to --least--.

Signed and Sealed this

Seventh Day of March, 1995

Attest:

BRUCE LEHMAN

Attesting Officer

Commissioner of Patents and Trademarks